(12) United States Patent
Betros et al.

(10) Patent No.: US 7,080,120 B2
(45) Date of Patent: Jul. 18, 2006

(54) SYSTEM AND METHOD FOR COLLABORATIVE PROCESSING OF DISTRIBUTED APPLICATIONS

(75) Inventors: Robert Betros, San Diego, CA (US); Mansour Raad, Winchester, MA (US)

(73) Assignee: Digital Orchid, Inc., San Diego, CA (US)

( * ) Notice: Subject to any disclaimer, the term of this patent is extended or adjusted under 35 U.S.C. 154(b) by 700 days.

(21) Appl. No.: 09/766,382

(22) Filed: Jan. 19, 2001

(65) Prior Publication Data

US 2002/0099847 A1    Jul. 25, 2002

(51) Int. Cl.
*G06F 15/16* (2006.01)
(52) U.S. Cl. .................. 709/205; 709/204; 709/227
(58) Field of Classification Search ............... 709/203, 709/204, 219, 232, 227, 205; 713/152; 370/401
See application file for complete search history.

(56) References Cited

U.S. PATENT DOCUMENTS

| | | | | |
|---|---|---|---|---|
| 5,426,637 | A * | 6/1995 | Derby et al. ................. | 370/401 |
| 5,590,281 | A * | 12/1996 | Stevens ....................... | 709/227 |
| 6,088,796 | A * | 7/2000 | Cianfrocca et al. ......... | 713/152 |
| 6,144,962 | A | 11/2000 | Weinberg et al. | |
| 6,182,119 | B1 | 1/2001 | Chu | |
| 6,192,394 | B1 * | 2/2001 | Gutfreund et al. .......... | 709/204 |
| 6,510,439 | B1 | 1/2003 | Rangarajan et al. | |
| 6,529,949 | B1 | 3/2003 | Getsin et al. | |
| 6,539,430 | B1 | 3/2003 | Humes | |
| 6,571,275 | B1 | 5/2003 | Dong et al. | |
| 6,604,125 | B1 * | 8/2003 | Belkin ......................... | 718/104 |
| 6,606,660 | B1 | 8/2003 | Bowman-Amuah | |
| 6,611,862 | B1 | 8/2003 | Reisman | |
| 6,643,683 | B1 * | 11/2003 | Drumm et al. .............. | 709/203 |
| 6,839,762 | B1 * | 1/2005 | Yu et al. ...................... | 709/232 |
| 6,880,010 | B1 * | 4/2005 | Webb et al. ................. | 709/227 |
| 2001/0042094 | A1 * | 11/2001 | Mitchell et al. ............. | 709/203 |

OTHER PUBLICATIONS

RFC 2616: Hypertext Transfer Protocol—HTTP/1.1, R. Fielding, etc., Jun. 1999.
S. Rangarajan, S. Yajnik, and P. Jalote, "WCP—A tool for consistent on-line update of documents in a WWW server", Computer Networks and ISDN Systems, vol. 30, issues 1-7. Article :FP32, Proceedings of the Conference on the World-Wide Web(WWW7), Apr. 1998.

* cited by examiner

*Primary Examiner*—Saleh Najjar
*Assistant Examiner*—Benjamin R. Bruckart
(74) *Attorney, Agent, or Firm*—Foley & Lardner LLP

(57) ABSTRACT

A system and operation is disclosed for collaborative processing of distributed applications. In a collaborative processing system, at least one application context is provided in which an application is executed. The context includes an application CGI for managing the application, and a communication interface on which application data is communicated as messages. A messaging bus is provided that is configured to communicate the messages for processing by the application.

20 Claims, 2 Drawing Sheets

SYSTEM AND METHOD FOR COLLABORATIVE PROCESSING OF DISTRIBUTED APPLICATIONS

BACKGROUND OF THE INVENTION

The present invention generally relates to computer systems, and more particularly to executing collaborative application software in a computer network.

Computer networks have become an important platform for storing and delivering application programs to users. In a model widely referred to as client/server, an application server is considered a central hub from which a number of clients can request and receive application software for performing a specific function. In the past, most applications were executed locally at a client, with application software that was locally stored in the client platform. Today, however, in one configuration, applications are stored in a central server, and delivered to a client in components for local processing. Another common configuration is for the client to send processing requests to the server, which executes the application that is specified in the request on the server and sends the results back to the client for local processing. In this configuration, the application is maintained in the server.

The tremendous growth of use of the Internet and World Wide Web (the "Web") in the past few years has resulted in increasingly more communication between clients and servers. Most of the communications in the short history of the Web relate to delivery of requested content data from a web server to a client. A web server is a specialized type of server that communicates according to a particular protocol, the hypertext transport protocol, or HTTP. Other hypermedia protocols are also used or are being developed.

Traditionally, Internet-based application processing in a client/server model occurs mostly through a web server. Network-based applications for the client/server model, such as those through the Web, are becoming increasingly complex and interactive. Problems with current software infrastructure for administering network-based applications include difficulty in the creation and delivery of application components, complexities of managing the interface between a client and a server, and processing delays and inefficiencies. The current and next generations of the Web, in its Internet, intranet and extranet embodiments, demand a platform-neutral architecture that can effectively handle complex Web-based distributed client/server applications for collaborative processing.

SUMMARY OF THE INVENTION

This invention relates to a system and method whereby one or more common gateway interfaces (CGIs) are enabled to function together. This invention provides a method and system for standardizing the execution, administration and intercommunication of application components running in conjunction with CGIs as well as with applications running on other hosts.

In accordance with one embodiment of the invention, a system includes at least one application context in which an application is executed, the context including an application CGI for managing the application, and a communication interface on which application data is communicated as messages. The system further includes a messaging bus configured to communicate the messages for processing by the application. The messaging bus can communicate to remote hosts via a multicast communication path, or to remote clients via a multibus extension.

DETAILED DESCRIPTION OF THE PREFERRED EMBODIMENTS

This invention relates to executing and processing applications. An application is software that performs specific logic. As used herein, the term application refers to an entire application, or an application component that defines a portion of an application. A number of application components can work together to execute the logic of the application. In one embodiment, this invention provides a method for communication between client-side application components and server-side application components. Further, the invention provides for the execution and administration of applications residing within a CGI engine hosted on a server platform. The invention provides a structure for performing collaborative processing with distributed applications.

In a preferred embodiment of the invention, a system and method for collaborative processing of distributed applications is embodied as one or more computer programs configured to work together. Every computer program includes at least one code section and at least one data section. The code section is a sequence of bytes that can be executed directly by the central processing unit (CPU) of a host. The data section includes sequences of bytes that may be executed by the CPU of the host, but which are mostly used to store data structures for use by the code section.

Figure 1:
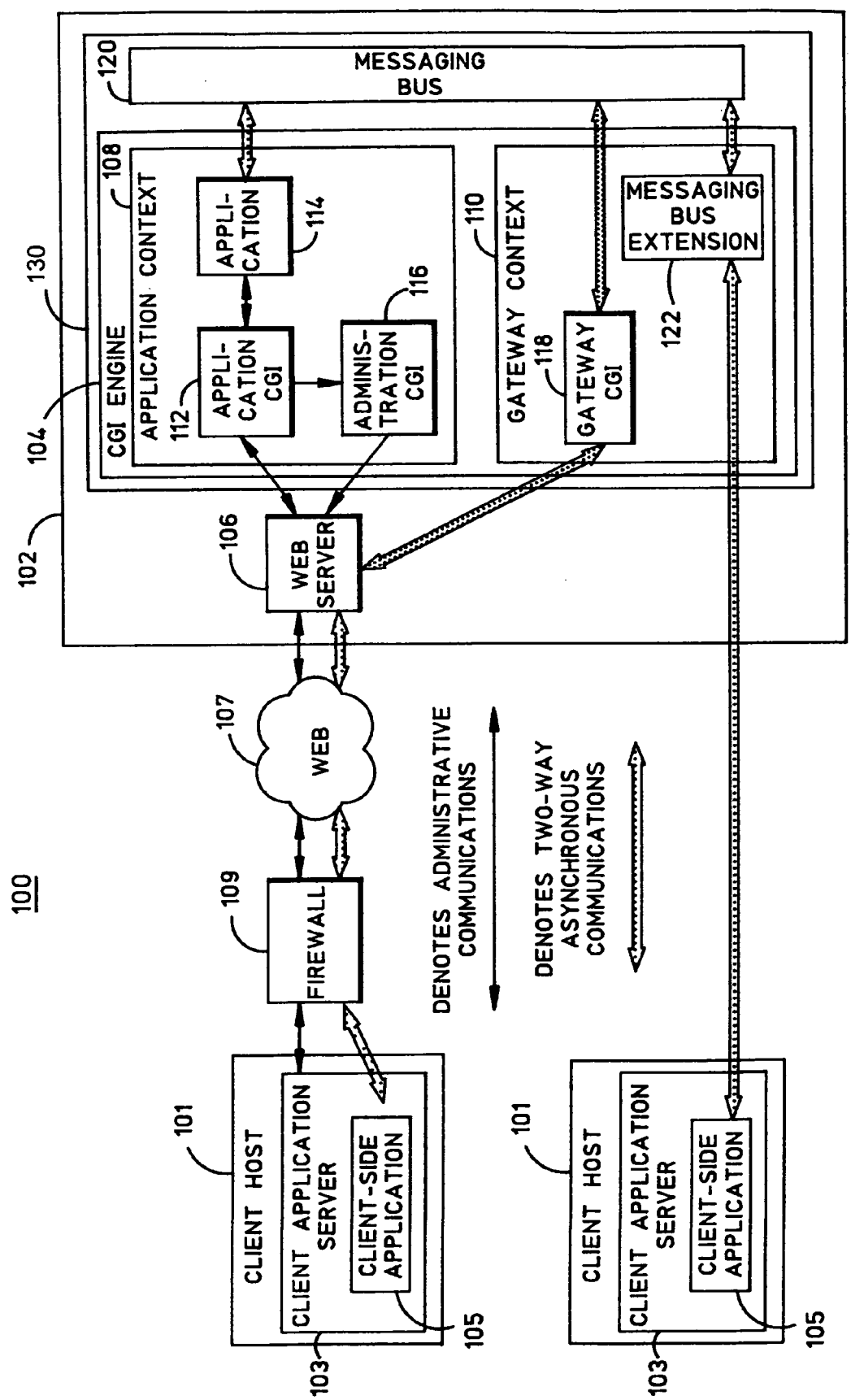
FIG. 1 shows a system for collaborative processing with distributed applications, according to one embodiment of the invention.

FIG. 1 shows a system 100 for collaborative processing of distributed applications, according to one embodiment of the invention. The system 100 includes a host 102. In one embodiment, the host 102 is a physical machine having an operating system that manages one or more computer programs. A computer program can include one or more operations running within it that share the same data section of the computer program. The host 102 can also include a CPU that executes the code section of the computer programs. The computer programs can be resident on the host 102 in permanent or temporary storage, or can be communicated to the host 102 by external computer programs.

The host 102 includes a computer program 130, which includes a CGI engine 104, which in an embodiment is an operation configured to execute and administer one or more CGIs, and a messaging bus 120, which in an embodiment is another operation configured to enable multiple operations within the computer program to communicate with each other. In a specific exemplary embodiment, the CGIs administered by the CGI engine 104 are servlets. A servlet is a particular type of CGI that can be configured to execute a certain function, such as manage an application, for example. While a servlet is typically written in the Java programming language, a CGI can be written according to other programming languages or logic structures. According to the invention, the CGI engine 104 is configured to function as an application server, including, without being limited to, logging information related to the use and operation of applications, authentication of users of CGIs, and authorization of the usage of the CGIs.

The host can also include a web server 106. The web server 106 functions as a conventional web server that communicates with a client according to the hypertext transfer protocol (HTTP). As used herein, HTTP means any application-level protocol that is supported by a web server or a web browser, including but not limited to secure HTTP (HTTPS). In an embodiment of the invention, the web server 106 also communicates with the CGI engine 104, from which the web server 106 executes one or more CGIs running in the CGI engine 104. In a specific embodiment, the web server 106 invokes and executes one or more servlets, through which communications are performed between the web server 106 and an application 114. One particular type of CGI according to the invention is an application CGI 112. The application CGI 112 is configured to execute and manage an associated application 114, in response to requests received from the web server 106. The application CGI 112 can be a servlet. One specific type of servlet for the application CGI is called a sublet. A sublet is a servlet extension that is specifically configured for executing and managing an associated application.

The CGI engine 104 can be configured with at least two contexts for running CGIs. One context is an application context 108. The application context 108 is a self-sustained environment of resources within the CGI engine 104 that is configured to, but not limited to, enable multiple CGIs and other programs to commonly share resources. The application context 108 also provides a secure environment in which an application CGI 112 and an application 114, and its supporting resources, can operate shielded from corruption by other CGIs or applications running in the CGI engine 104. For each application 114, the CGI engine 104 is configured to create an application context 108 that includes an application CGI 112 and one or more administration CGIs 116 associated with the application CGI 112. The application context 108 enables CGIs, such as administration CGIs 116, and application CGIs 112 with features that include, but are not limited to, getting the actual location of a physical resource within the host 102 from a representation of that resource, and logging messages and exceptions being generated by the application. The application context 108 is further configured to enable the application 114 to get a reference, i.e. find where in a memory, to other applications within the CGI engine 104 that are registered to communicate with the application 114. The reference can be based on a name of the application 114.

A second context is a gateway context 110, an environment having resources for performing two-way asynchronous communication between applications on the same host and different hosts. One form of such communication is notification, in which two programs, or two operations within a program or within multiple programs, communicate data with each other without being polled for the data by the other.

Applications 114 within the CGI engine 104 communicate with each other asynchronously via a messaging bus 120. In a specific embodiment, the messaging bus 120 has multiple inputs and outputs and is configured to communicate data between associated inputs and outputs. A unit of information that enters and leaves the messaging bus 120 is a message. There are multiple pairs of entry and exit points on the messaging bus 120. Each pair represents a topic. Publishing is the act of sending a message to a topic on the messaging bus 120. Subscribing is the act of registering to a topic, and receiving the messages published on that topic. An application 114 can be both a publisher and subscriber to one or more topics. When a message is published to a particular topic, the message is communicated to all subscribers registered to that topic simultaneously. In this way, collaborative communication and processing between publishers and subscribers to a topic, through a particular application, is enabled.

For efficient communication between applications, an application 114 or client-side application 105 can employ a filter on the messaging bus to scan the content of messages on a certain topic, and determine whether the application employing the filter will either process the message or disregard it. Such a filtering mechanism is described in U.S. patent application Ser. No. 09/766,383, "System and Method for Generating Machine-Language Code from Readable Text Code for Information Filtering," incorporated by reference herein for all purposes.

The messaging bus 120 can logically extend across multiple hosts, enabling external applications to communicate with applications 114 that reside within the local CGI engine 108. Extension of the messaging bus 120 can occur whether or not a firewall 109 or proxy server resides in the communication path between the local CGI engine 104 and the external applications. One example of an external application is a client-side application 105 that resides in a client host 101 and runs within a client application server 103.

Figure 2:
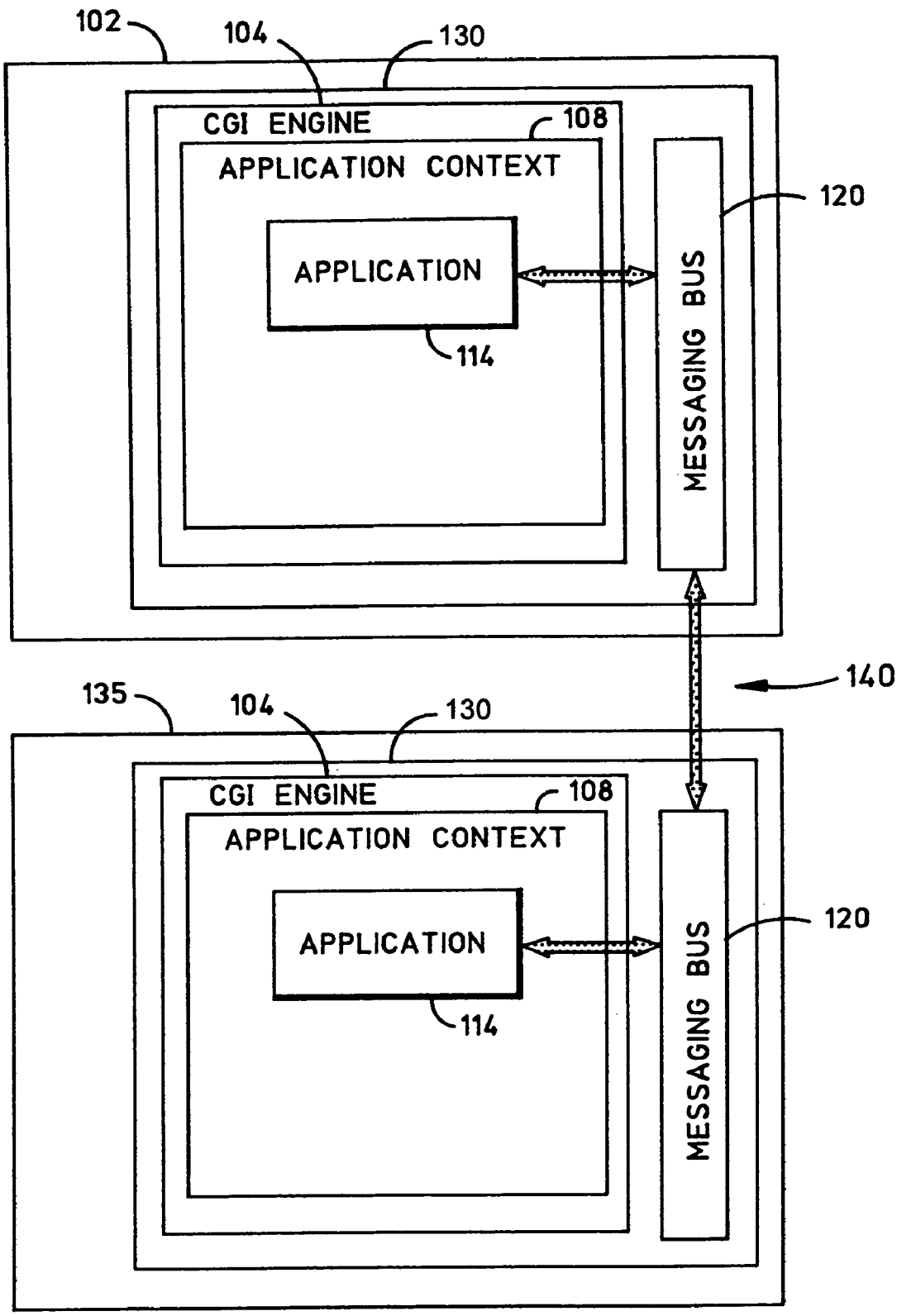
FIG. 2 shows communication between a host and a remote host via the messaging bus.

In one embodiment, the messaging bus 120 is extended through the use of a multicast protocol and configured to communicate with one or more other messaging busses, and wherein each other messaging bus is resident on a remote host 135. FIG. 2 illustrates a multicast communication path 140 between the host 102 and any remote host 135. Each host must support this protocol.

When the communication path does not support the multicast protocol, an external application can communicate asynchronously with the messaging bus 120 through a direct socket connection to the messaging bus extension 122. In one embodiment, the messaging bus extension 122 is created using the socket select( ) method. The socket select( ) method enables the efficient handling of large numbers of simultaneous socket connections to the messaging bus 120. The socket select( ) method, which can be executed by the operating system of the host 102, waits until information is available on any of the open socket connections to the host 102. Upon the arrival of the information, the socket select( ) method returns a data structure that indicates which socket connections have information available to be processed. The messaging bus extension 122 uses the information within the returned data structure to read the available information from each specified socket connection. The information read from each socket is converted to a message and published onto the messaging bus 102 on a specific topic.

The messaging bus extension 122 multiplexes the input and output operations of the socket to publish and subscribe messages. The multiplexing can be directed by the operating system of the host 102.

When the host 101 is located behind a firewall 109 or proxy server, the extension of the messaging bus is implemented as described in U.S. patent application Ser. No. 09/766,439, "System and method for Maintaining Two-Way Asynchronous Notification Between a Client and a Web Server," incorporated by reference here all purposes. A gateway CGI 118 implements the two-way asynchronous communication through a firewall 109 or proxy server. In one embodiment, the gateway CGI 118 can be one or more servlets, administered and executed within the gateway context 110. When an external application that is not behind a firewall 109 or proxy server communicates messages to the messaging bus 120, a messaging bus extension 122 is used.

External applications can reside on another host, or on the same host 102 in another CGI engine. External applications can also reside on a client host 101, where they are executed as a client-side application 105. A client host 101 can include a client application server 103 in which the client-side application 105 is pre-installed, or to which the client-side application 105 is dynamically delivered from the web server 106 in the host 102.

The CGI engine 104, in communication with the web server 106, provides one form of access to the application 114. The web server 106 is configured to direct certain client requests from a client 101 to the relevant application CGI 112 in the CGI engine 104.

In an exemplary embodiment of the invention, the application CGI 112 is configured as a sublet and interacts with the application 114 according to an interface definition. In a specific embodiment, the interface definition is an extension of a servlet interface definition. This interface definition includes, without limitation, the following operations:

an initialization operation that accepts as an argument the application CGI configuration,
a service operation to return information about the associated application 114,
a destroy operation to be invoked by the termination of the execution of the CGI engine 104 that enables the release of reserved resources and terminates the application CGI 112 and its associated application 114,
operations to load and save the current state of the associated application 114,
operations to set and get the internal attributes of the associated application 114,
an operation to invoke an operation within the associated application 114.

The initialization operation of each application CGI 112 receives the application CGI configuration and applies it to the associated application 114 to prepare it for use. The application CGI configuration includes, without limitation, the following information:

a list of initialization parameter names.
an initialization parameter value for a given a parameter name.
a reference to the application context 108.

The service operation of the application CGI 112 gathers and returns information about the associated application 114. This information includes without limitation:

a list of information about the attributes of the application 114 that includes the attribute name, description, type, and read/write accessibility,
a list of information about the operations within the application 114 that includes each operation's name, description, type of information returned and information about the operation's parameters.
Information about an operation parameter includes the parameter name, description and type.

The application CGI 112 can handle HTTP requests through its service operation. The implementation of the service operation in the application CGI 112 is used to administer the associated application 114. The administration includes, but is not limited to, the retrieval of information about the application 114, the retrieval and modification of its attribute values, the invocation of an operation within the application 114 and the saving of the current state of the application 114. The information and status returned from the administrative tasks is forwarded to the administration servlet 116 to format this information for presentation purposes.

Operation of the system 100 is as follows. In one embodiment, the CGI engine 104 administers the application 114 through the use of the web server 106. For instance, a client host 101 initiates the execution the application 114 by submitting an HTTP request to the web server 106 from the client-side application 105. The client-side application 105 can be, for example, an application running inside of a web browser program. The web server 106 redirects the request to the CGI engine 104. The CGI engine 104 invokes the application CGI 112 associated with the application 114 to process the request, which returns a response containing the result of the request to the web server 106 who forwards it on to the client host 101, for use by the client-side application 105.

When the CGI engine 104 starts, it loads the configuration files associated with each CGI. The content of a configuration file is called the CGI configuration. For each CGI in the CGI engine 104, the CGI engine 104 scans the CGI configuration to determine which of the CGIs needs to be instantiated at startup time. The CGI engine 104 invokes a standard initialization operation on each CGI that is instantiated with the CGI configuration as an argument. Upon the successful completion of the initialization operation, the CGI is registered to run within the CGI engine 104.

For the application CGI 112, the standard initialization operation composes a sublet configuration from the content of the scanned configuration file, and invokes the initialization operation of the associated application 114 with the application CGI configuration as an argument. If the initialization operation is successful, then the load operation of the application CGI 112 is invoked. The load operation is used to load the previously saved state of the application 114. When the CGI engine 104 is instructed to terminate the application CGI 112, the destroy operation in each registered CGI is invoked. This inherently invokes a sublet destroy operation to terminate the application 114.

Administrative actions that can be requested by the client host 101 from the client-side application 105 and executed by the CGI engine 104 include, without limitation, initiating and terminating the application 114, and modifying its logic flow.

When the messaging bus 120 is extended to a client-side application 105 running within the environment of the client application server 103, the client-side application 105 can publish, subscribe and process messages from the messaging bus 120. The client-side application 105 receives a message, processes the message, and composes a data structure that can be understood by the client application server 103. The client-side application 105 then delivers the data structure to the client application server 103 and instructs it to process the content of the delivered data structure.

In a specific exemplary embodiment of the invention, the administration CGI 116 is implemented using the Java Server Page (JSP) specification. The information forwarded to the administration CGI 116 is packaged as an attribute value within the HTTP request. The administration CGI 116 retrieves the attribute value and reformats it into a document that is readable by the requesting client application 103. In a preferred embodiment, the document format is in HTML. As used herein, HTML means any document format that is supported by a web browser, including but not limited to Dynamic HTML (DHTML).

In the specific exemplary embodiment, the client application server 103 is a web browser, the client-side application 105 is an HTML document with a Java Applet. The web server 106 that is running in conjunction with the CGI engine 104 delivers the HTML document with the Java applet to the web browser 103. Upon the completion of the delivery, the Java Applet is initiated and establishes a connection to the messaging bus 120 as described above. The Java Applet now contains an extension of the messaging bus 120 and is a publisher and/or subscriber to one or more topics on the messaging bus 120.

The Java Applet is configured to call specific functions in the HTML document upon the receipt of a message on a particular topic or topics. The functions within the HTML document or template accept as arguments the property values of the message and convert these values into a HTML formatted text string that is executed by a component within the HTML document or template.

In another embodiment, the client-side application 105 is a Java Applet and the HTML document or template can be delivered as a property value within a message. The Java Applet reads the HTML document or template within the message and instructs the web browser 103 to render the HTML document or template.

In still another embodiment, The client-side application 105 is a Java Applet that dynamically generates the HTML document or template and the result is forwarded to a component in the web browser 103 for rendering.

Other embodiments, combinations and modifications of this invention will occur readily to those of ordinary skill in the art in view of these teachings. Therefore, this invention is to be limited only by the following claims, which include all such embodiments and modifications when viewed in conjunction with the above specification and accompanying drawings.

What is claimed is:

1. A system for collaborative processing with distributed applications, comprising:
   at least one application context in which an application is executed, the application context including an application CGI for managing the application, and a communication interface on which application data is communicated as messages;
   a messaging bus configured to communicate the messages for processing by the application;
   at least one gateway context including a gateway CGI configured for maintaining two-way asynchronous communication between the messaging bus and a remote application through a firewall, said remote application being executed by a client, the gateway CGI configured to maintain the two-way asynchronous communication until termination by the remote application or by the gateway CGI; and
   a web server, said web server configured to establish one socket connection with said client through said firewall and configured to initialize the gateway CGI after receiving an HTTP request to initialize the gateway CGI from said remote application over said one socket connection during a single HTTP transaction with the remote application;
   wherein the gateway CGI is configured to perform operations to enable said two-way asynchronous communication between said messaging bus and said remote application to occur within the single HTTP transaction and over said one socket connection.

2. The system of claim 1, wherein the web server is in communication with the application CGI.

3. The system of claim 2, wherein the application context includes an administration CGI in communication between the web server and the application CGI for receiving information about the application and providing a document for transmission by the web server.

4. The system of claim 3, wherein the administration CGI is configured to format application data retrieved from the application through the application CGI into presentation data that is readable by another application.

5. The system of claim 4, wherein the presentation data is in a format that is readable by a web browser.

6. The system of claim 4, wherein the format of the presentation data is in HTML.

7. The system of claim 1, further comprising a messaging bus extension adapted for maintaining direct socket connections between the messaging bus and remote applications.

8. The system of claim 7, wherein the messaging bus extension includes a multiplexer for multiplexing one or more direct socket connections to the messaging bus.

9. The system of claim 7, wherein the messaging bus extension is configured to publish and subscribe message data between applications.

10. The system of claim 1, wherein the messaging bus is configured to communicate with one or more other messaging busses, and wherein each other messaging bus is resident on a remote host.

11. The system of claim 10, wherein the messaging bus is configured to communicate according to a multicast protocol.

12. The system of claim 1, wherein each application is configured to publish and subscribe message data with other applications via the messaging bus.

13. The system of claim 1, wherein the messaging bus includes a filter for filtering the message data.

14. The system of claim 13, wherein the filter is configured to filter messages according to a filter criteria executed by each application.

15. The system of claim 1, wherein the remote application generates presentation data that is readable by another application.

16. The system of 15, wherein the presentation data is in a format that is readable by a web browser.

17. The system of claim 16, wherein the format of the presentation data is in HTML.

18. The system of claim 15, wherein a web browser is configured to read the presentation data.

19. A system for collaborative processing with distributed applications, comprising:
   at least one application context in which an application is executed, the application context including an application CGI for managing the application, and a communication interface on which application data is communicated as messages;
   a messaging bus configured to communicate the messages for processing by the application;
   at least one gateway context including a gateway CGI configured for maintaining two-way asynchronous communication between the messaging bus and a remote application through a firewall, said remote application being executed by a client, the gateway CGI configured to:
   a) receive a request from the remote application;
   b) execute operations associated with the gateway CGI, wherein the operations are configured to perform the two-way asynchronous communication with the remote application; and
   c) repeat at least one of the operations in step b) until termination of the gateway CGI by the remote application or by the gateway CGI; and
   a web server, said web server configured to establish one socket connection with said client through said firewall and configured to initialize the gateway CGI after receiving an HTTP request to initialize the gateway CGI from said remote application over said one socket connection during a single HTTP transaction with the remote application;

wherein the gateway CGI is configured such that the operations executed by the gateway CGI enable said two-way asynchronous communication between said messaging bus and said remote application to occur within the single HTTP transaction and over said one socket connection.

20. A storage medium storing one or more computer programs for causing a host computer to execute a process, said one or more computer programs including program code for a web server and a gateway CGI, said process comprising:

opening, by the web server, one socket connection with a client computer;

initializing, by the web server, the gateway CGI after receiving an HTTP request to initialize the gateway CGI from the client computer over the one socket connection during a single HTTP transaction with the client computer;

performing, by the gateway CGI, operations to enable two-way asynchronous communication between the host computer and the client computer to occur within the single HTTP transaction and over the one socket connection;

ending, by the gateway CGI, the performance of the operations after receiving a termination request from the client computer; and closing, by the web server, the one socket connection.

* * * * *

UNITED STATES PATENT AND TRADEMARK OFFICE
CERTIFICATE OF CORRECTION

PATENT NO. : 7,080,120 B2 Page 1 of 1
APPLICATION NO. : 09/766362
DATED : July 18, 2006
INVENTOR(S) : Betros et al.

It is certified that error appears in the above-identified patent and that said Letters Patent is hereby corrected as shown below:

Column 4, line 60: the text "incoporated by reference here all purposes" should read --incorporated by reference herein for all purposes--.

Signed and Sealed this

Twenty-seventh Day of February, 2007

JON W. DUDAS
*Director of the United States Patent and Trademark Office*

UNITED STATES PATENT AND TRADEMARK OFFICE
CERTIFICATE OF CORRECTION

PATENT NO. : 7,080,120 B2
APPLICATION NO. : 09/766382
DATED : July 18, 2006
INVENTOR(S) : Betros et al.

It is certified that error appears in the above-identified patent and that said Letters Patent is hereby corrected as shown below:

Column 4, line 60: the text "incoporated by reference here all purposes" should read --incorporated by reference herein for all purposes--.

This certificate supersedes Certificate of Correction issued February 27, 2007.

Signed and Sealed this

Twentieth Day of March, 2007

JON W. DUDAS
*Director of the United States Patent and Trademark Office*